US006561055B1

(12) United States Patent
Turk

(10) Patent No.: US 6,561,055 B1
(45) Date of Patent: May 13, 2003

(54) VENT WINDOW ACTUATOR

(75) Inventor: Michael F. Turk, Waterford, MI (US)

(73) Assignee: Hi-Lex Corporation, Battle Creek, MI (US)

( * ) Notice: Subject to any disclaimer, the term of this patent is extended or adjusted under 35 U.S.C. 154(b) by 0 days.

(21) Appl. No.: 09/839,047

(22) Filed: Apr. 20, 2001

(51) Int. Cl.[7] .............................. F16H 1/16; E05F 11/00
(52) U.S. Cl. ............................. 74/425; 74/416; 49/324
(58) Field of Search ...................... 74/425, 416; 49/324

(56) References Cited

U.S. PATENT DOCUMENTS

| 3,845,585 | A | * | 11/1974 | Cecil ........................... 49/139 |
| 4,069,616 | A | * | 1/1978 | Doveinis ..................... 49/103 |
| 4,137,796 | A | * | 2/1979 | Bostrom ................... 192/69.63 |
| 4,186,524 | A | * | 2/1980 | Pelchat ........................ 49/324 |
| 4,407,093 | A | * | 10/1983 | Spretnjak et al. ........... 411/119 |
| 4,918,865 | A |   | 4/1990 | Hirai ........................... 49/347 |
| 5,140,771 | A |   | 8/1992 | Moy et al. .................... 49/340 |
| 5,161,419 | A |   | 11/1992 | Moy et al. ..................... 74/42 |
| 5,203,113 | A |   | 4/1993 | Yagi ............................ 49/324 |
| 5,205,074 | A | * | 4/1993 | Guhl et al. ................. 267/175 |
| 5,227,685 | A | * | 7/1993 | Krouse ........................ 310/239 |
| 5,385,061 | A |   | 1/1995 | Moy et al. ...................... 74/42 |
| 5,438,801 | A |   | 8/1995 | Ishihara et al. ............... 49/357 |
| 5,570,606 | A | * | 11/1996 | Irie ............................. 74/425 |
| 5,680,728 | A |   | 10/1997 | Moy ........................... 49/324 |
| 5,755,468 | A | * | 5/1998 | Buchanan, Jr. ........ 292/341.16 |
| 5,901,500 | A |   | 5/1999 | Tsuda et al. ................. 49/324 |
| 6,307,344 | B1 | * | 10/2001 | Pajak et al. ................. 318/558 |

* cited by examiner

Primary Examiner—David A. Bucci
Assistant Examiner—Julie K. Smith
(74) Attorney, Agent, or Firm—Young & Basile P.C.

(57) ABSTRACT

An actuator for a vent window of a motor vehicle wherein the drive mechanism interconnecting the output shaft of the motor and the pivot arm controlling the vent window comprises a first worm driven by the motor output shaft, a first worm wheel driven by the first worm, a second worm driven by the first worm wheel, and a second worm wheel driven by the second worm in driving the pivot arm. The first worm wheel is formed of a plastic material and the actuator further includes a coil spring mounted on the housing proximate the second worm wheel and operative to assist the second worm wheel in generating a sealing force sufficient to positively seal the vent window against a window seal of the motor vehicle.

8 Claims, 4 Drawing Sheets

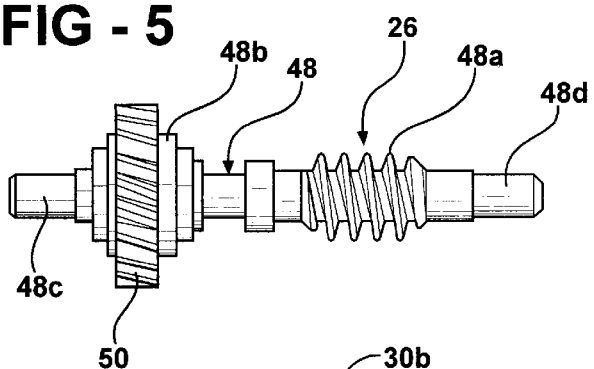
FIG - 5
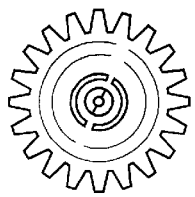
FIG - 6
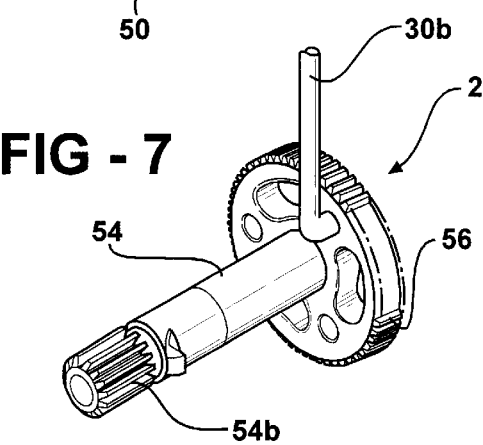
FIG - 7
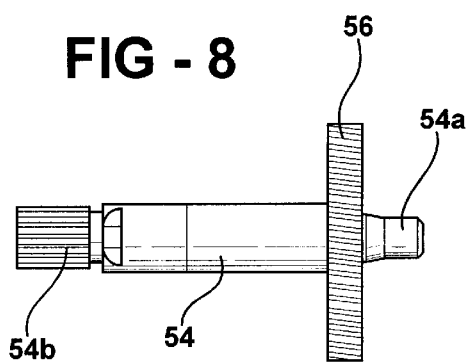
FIG - 8
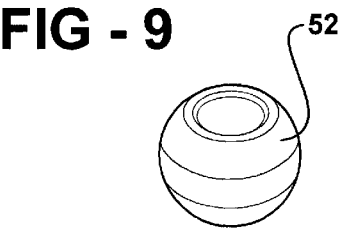
FIG - 9
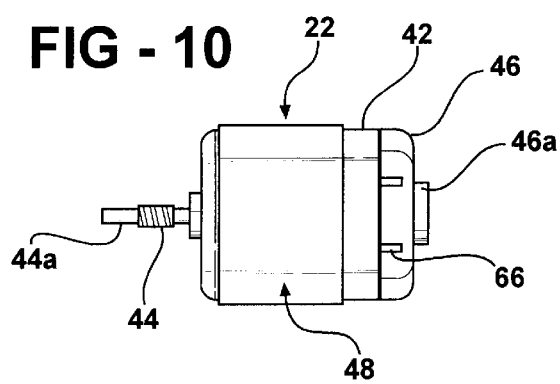
FIG - 10
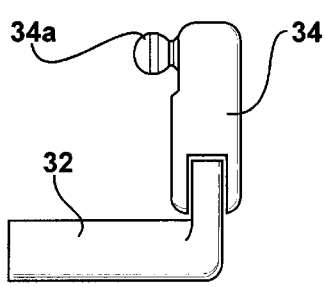
FIG - 11
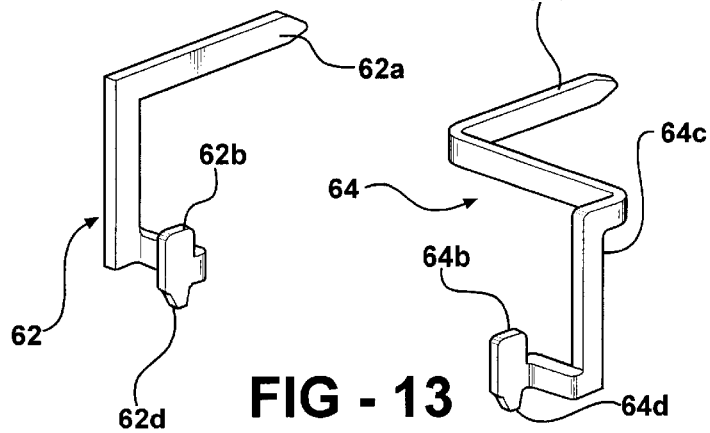
FIG - 12
FIG - 13

VENT WINDOW ACTUATOR

FIELD OF THE INVENTION

This invention relates to a power window actuator and particularly to a power window actuator for a swingably or pivotally mounted window such as a rear side vent or corner window of a motor vehicle such as a van.

BACKGROUND OF THE INVENTION

It is desirable to provide a powered rear side vent window for ventilation purposes in vehicles, particularly vans and minivans. These rear side vent windows are generally swingably mounted and open outwardly in the vehicle body and are typically remotely activated as, for example, from the driver's seat.

Several types of vehicle power vent window actuators are known and used. Whereas these prior art actuators are generally satisfactory, they typically suffer from one or more disadvantages. Specifically, the prior art actuators are relatively expensive and/or overly large and/or are relatively noisy in operation.

SUMMARY OF THE INVENTION

This invention is directed to an improved vent window actuator.

More specifically, this invention is directed to a vent window actuator that is inexpensive, quiet in operation, and compact.

The actuator of the invention is of the type including a housing, an electric motor mounted on the housing, a pivot arm mounted on the housing and adapted to be connected to the vent window to effect opening and closing movement of the vent window in response to pivotal movement of the pivot arm, and a drive mechanism interconnecting the output of the motor and the pivot arm and operative in response to energization of the motor to pivot the pivot arm and move the vent window.

According to the invention, the drive mechanism comprises a first worm driven by the motor, a first worm wheel driven by the first worm, a second worm driven by the first worm wheel, and a second worm wheel driven by the second worm and driving the pivot arm. This arrangement, employing two successive worm drives, provides the quiet operation inherent in a worm drive and, by virtue of the speed reduction achieved utilizing the successive worm drives, allows the use of a smaller, less expensive motor.

According to a further feature of the invention, the first worm wheel is formed of a plastic material. This choice of material, which is made possible by the fact that the back drive loading imposed on the actuator is largely absorbed by the second worm drive, allows the cost of the actuator to be further reduced by virtue of the relatively inexpensive plastic material of the first worm wheel.

According to a further feature of the invention, the actuator further includes a coil spring mounted on the housing proximate the second worm wheel and operative to assist the second worm wheel in generating a sealing force sufficient to positively seal the vent window against the window seal of the motor vehicle. This arrangement allows the actuator to satisfy even very high window sealing requirements irrespective of the use of a relatively small, low power motor.

According to a further feature of the invention, the drive mechanism comprises a first shaft extending coaxial with the motor output and driven by the motor, a second shaft driven by the first shaft and extending perpendicular to the first shaft, and a third shaft extending perpendicular to the first and second shaft, driven by the second shaft, and driving the pivot arm. These three drive shafts arranged in a mutually perpendicular or cross relationship facilitate the compact packaging of the drive mechanism of the actuator and ensure a robust and smooth transmission of power from the motor to the pivot arm.

According to a further feature of the invention, the motor includes a hub at one end thereof and an output shaft at another end thereof; the first worm is mounted on the output shaft; the housing includes a cavity, a first saddle proximate one end of the cavity, and a second saddle proximate another end of the cavity; and the motor is mounted in the cavity with a free end of the output shaft journaled in the first saddle and the motor hub seated in the second saddle. This arrangement allows a firm, positive mounting of the motor in the housing whereby to eliminate motor wobble and consequent excessive wear in the drive mechanism.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 5 is a side elevational view of an output worm assembly utilized in the actuator;

FIG. 6 is an end view of the output worm assembly;

FIG. 7 is a perspective view of an output shaft assembly utilized in the actuator;

FIG. 8 is a side elevational view of the output shaft assembly;

FIG. 9 is a perspective view of bearing utilized in the actuator;

FIG. 10 is a detailed view of the actuator motor;

FIG. 11 is a view of an actuator arm assembly employed in the actuator;

FIGS. 12 and 13 are perspective views of terminals utilized in the actuator;

DESCRIPTION OF THE PREFERRED EMBODIMENT

Figure 1:
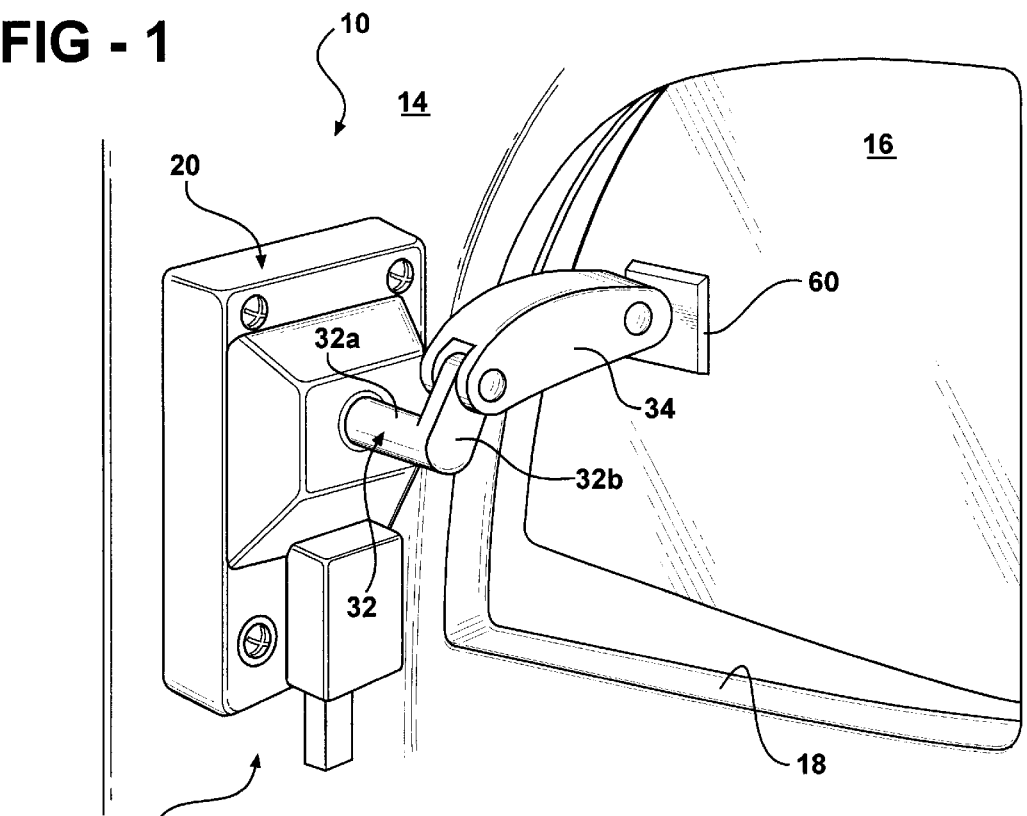
FIG. 1 is a fragmentary perspective view of a motor vehicle employing a vent window actuator according to the invention.

The actuator 10 of the invention is seen in FIG. 1 in association with a motor vehicle 12 which is shown fragmentarily. The motor vehicle 12 may be of a minivan type and includes a D pillar 14, and a vent window 16 pivotally mounted in a vent window opening 18 for movement by the actuator 10 between open and closed positions.

Figure 2:
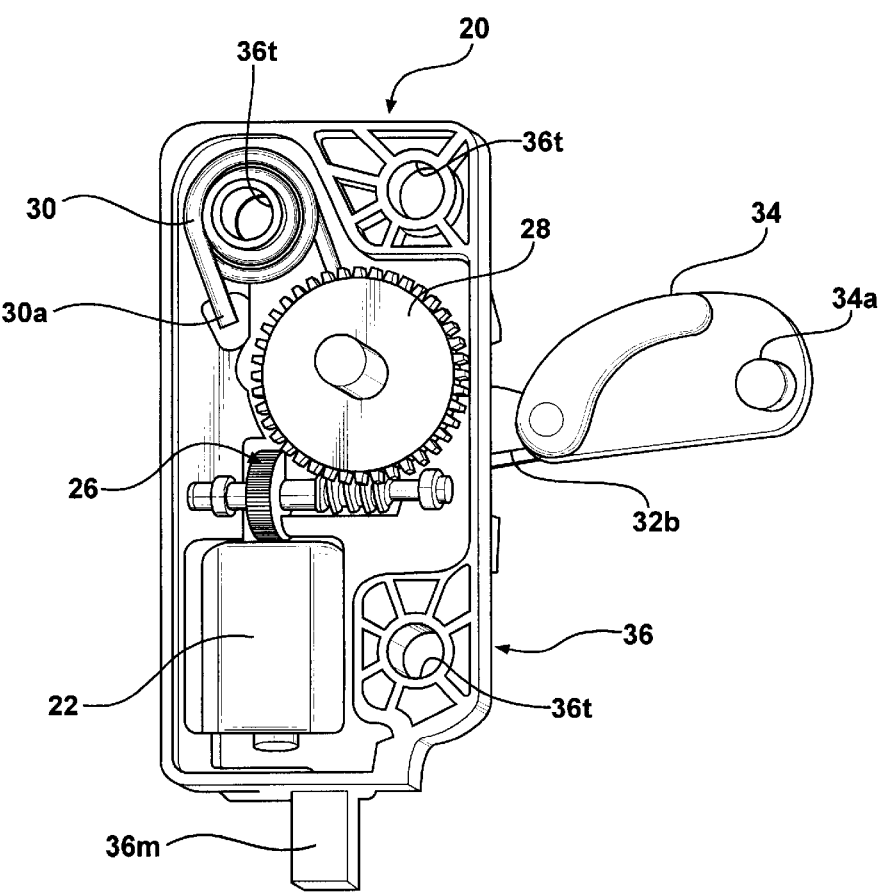
FIG. 2 is a perspective view of the actuator with a housing cover member removed.
Figure 3:
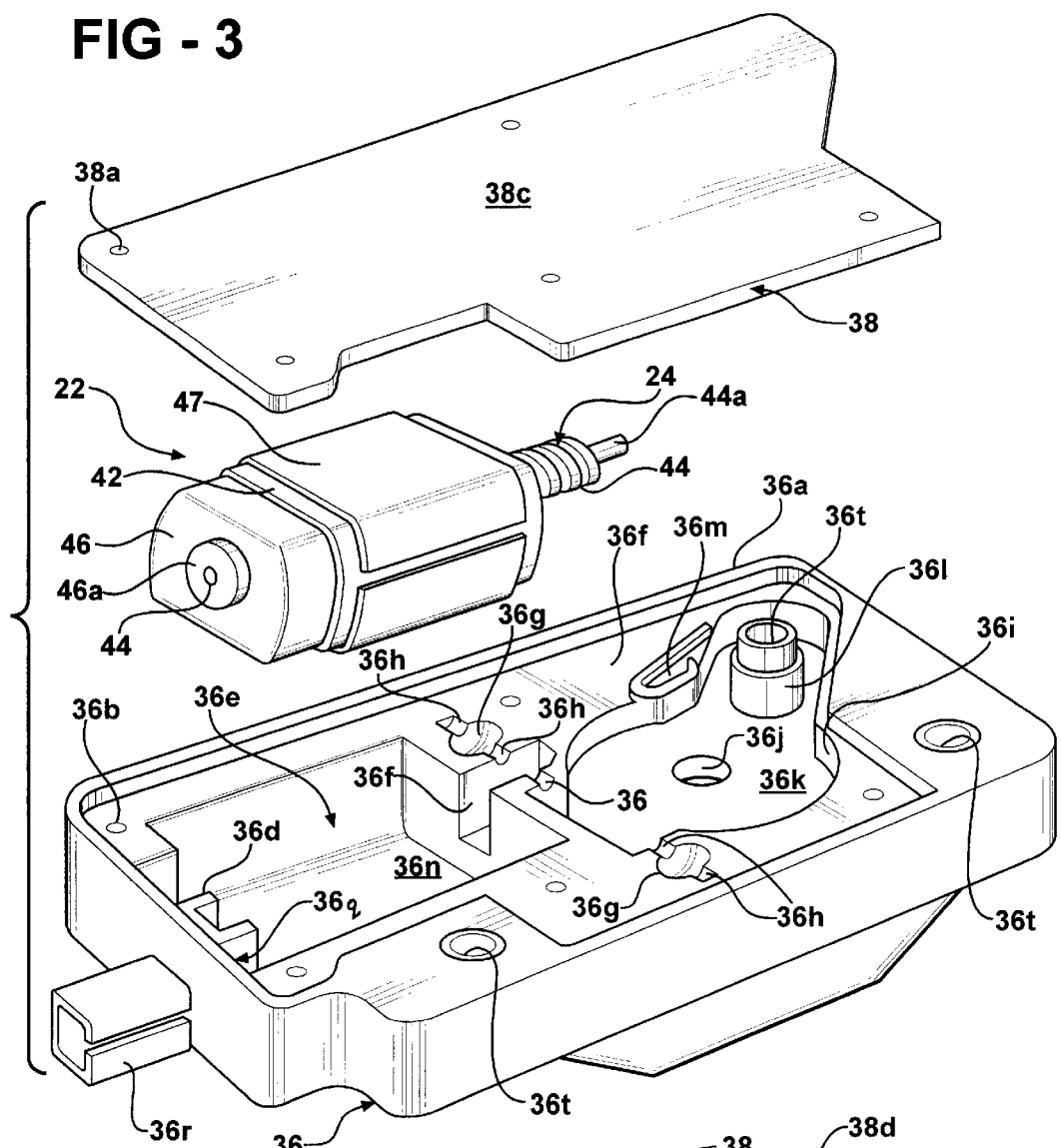
FIG. 3 is a perspective view of the main body member of the actuator housing also showing, in exploded fashion, the actuator motor and the housing cover.

Actuator 10 (FIGS. 2 and 3) includes a housing 20, a motor 22, a motor worm 24, an output worm assembly 26, an output shaft assembly 28, a spring 30, a link 32, and a link or handle 34.

Housing 20 is suitably formed in a molding operation of a plastic material such, for example, as a glass-filled polyester. Housing 20 includes a main body housing member 36 and a planar cover or lid 38. Main body housing 36 is suitably configured to accommodate the drive mechanism of the actuator, and cover 38 has a planar configuration and is adapted to be seated within a rim 36*a* of the main body housing to encapsulate the drive mechanism within the housing. The cover may be secured to the main body housing utilizing suitable fasteners coacting with holes 38*a* in the cover and holes 36*b* in the main body housing. Housing 20 is secured to D pillar 14 (FIG. 1) utilizing suitable fasteners passing through apertures 36*t* in main body housing 36.

Motor 22 is sized to fit in a recess or cavity 36*c* defined by main body housing 36 and comprises a fractional horse power 6000 rpm direct current motor of the type typically used to control automotive door lock circuits. The motor, for example, may comprise a motor available from Johnson Electric Industrial Manufacturing Ltd. of Hong Kong, China as part number NF243G/NS/25028/4E0. Motor 22 includes a main body housing 42, an output shaft 44, a connector 46, and a flux jacket 47. Flux jacket 47 is positioned in surrounding relation to housing 42 and connector 46, which may be formed of a suitable plastic material, is received in an open end of the housing 42 and includes a hub portion 46*a* journaling the rear end of output shaft 44.

Figure 4:
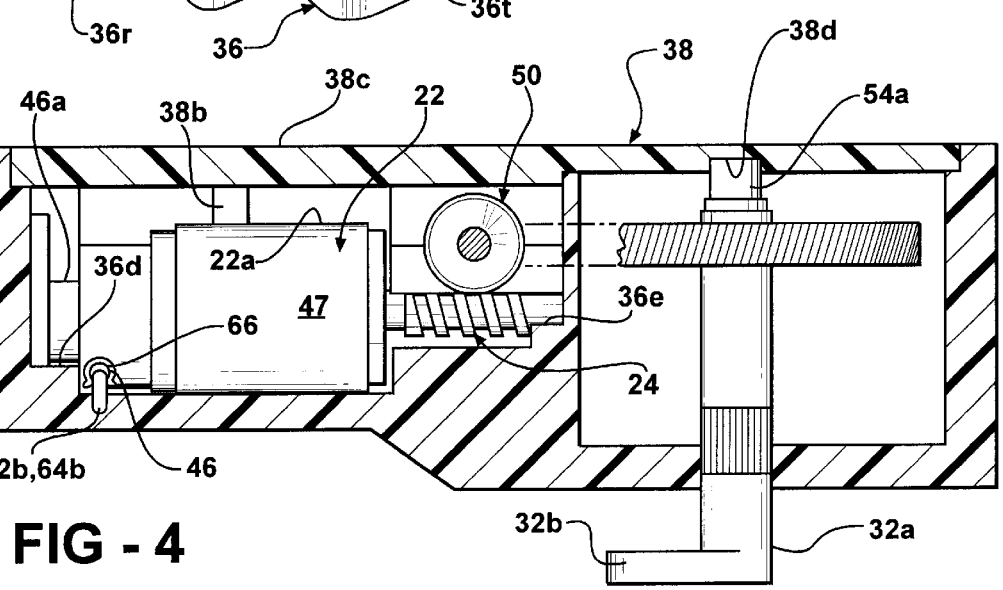
FIG. 4 is a detailed sectional view showing the mounting of the motor in the housing.
Figure 14:
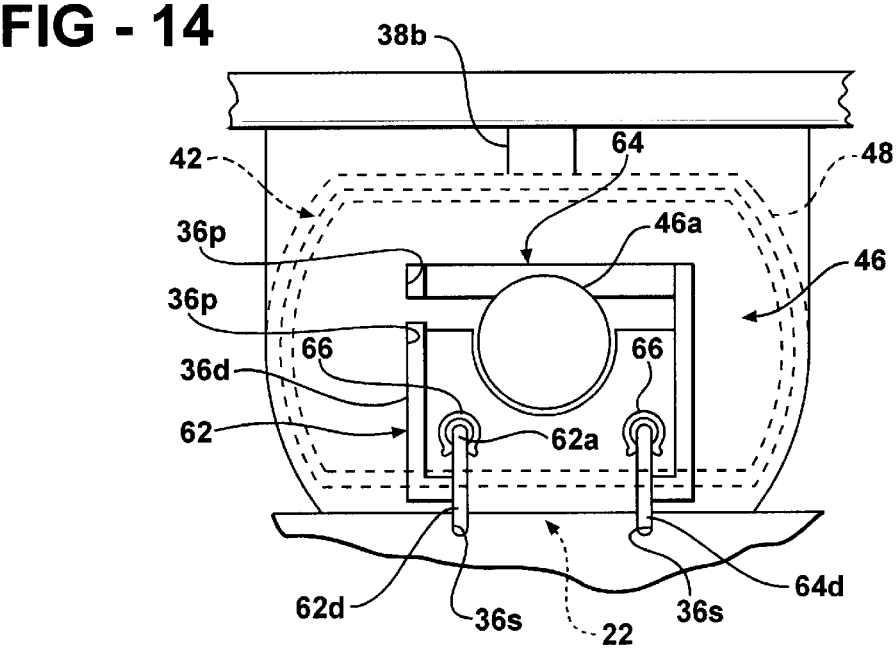
FIGS. 14 and 15 are detail views showing the mounting of the motor in the actuator housing.
Figure 15:
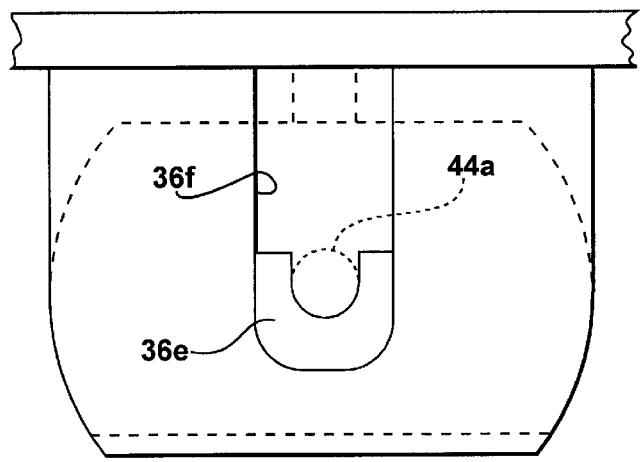

Motor 22 (see also FIGS. 4, 14 and 15) is positioned in cavity 36*c* with hub 46*a* seated in a U-shaped saddle 36*d* defined proximate one end of cavity 36*c* and with the free end 44*a* of output shaft 44 journaled in a U-shaped saddle 36*e* defined at the blind end of a groove 36*f* opening in the end of cavity 36*c* opposite saddle 36*d*. Motor worm 24 may be formed of a suitable brass material and is press fit onto motor output shaft 44 to expose the free end 44*a* of the output shaft for journaling in saddle 36*e*. Worm 24 may, for example, have a diametral pitch of 48 teeth per inch and a lead angle of 12° right hand.

Output worm assembly 26 (FIGS. 2, 5, and 6) includes a shaft 48, an output worm 48*a* formed integrally with the shaft, and a worm wheel 50. Worm wheel 50 is formed of a suitable plastic material, such as nylon, and is press fit on a hub portion 48*b* of shaft 48 utilizing suitable knurling on the hub portion. Worm wheel 50 has helical teeth with a helix angle of 12° right hand and a diametral pitch of 48 teeth per inch.

Shaft 48 and worm 48*a* are formed of a suitable ferrous material, such, for example, has SAE steel 12 L14. Output worm 48*a* has a lead angle of six° right hand and a diametral pitch of 48 teeth per inch.

Output worm assembly 26 is positioned in housing main body 36 utilizing spherical bearings 52 (FIG. 9) received with a press fit in spherical sockets 36*g* (FIG. 3) opening at laterally-spaced locations in the upper face 36*f* of housing 36. A first spherical bearing 52 receives one free end 48*c* of shaft 48 and a second spherical bearing 52 receives the other free end 48*d* of the shaft to mount the shaft axis at right angles with respect to the axis of the output shaft of the motor with worm wheel 50 positioned in the groove 36*f* in meshing engagement with motor worm 24 and with suitable saddle cutouts 36*h* in the housing accommodating the various intermediate segments of the shaft 48.

Output shaft assembly 28 (FIGS. 2, 7, and 8) comprises an output shaft 54 and an output gear 56 both formed of a suitable ferrous material. Gear 56 is press fit on one end of shaft 54 to expose a pilot or journal portion 54*a* and includes straight-cut gears having a diametral pitch of 48 teeth per inch.

Output shaft assembly 28 is positioned in housing member 36 with gear 56 positioned in a circular cavity 36*i* opening in the upper face 36*f* of the housing and arranged in meshing engagement with output worm 48*a* with the portion of shaft 54 remote from pilot end 54*a* extending downwardly in a perpendicular journal bore 36*j* opening in a recessed face 36*k* of the housing. The axis of shaft 54 is thus positioned perpendicular or crossed with respect to the axis of shaft 48 and perpendicular or crossed with respect to the axis of the motor output shaft 44.

Spring 30 comprises a coil spring 30 positioned in surrounding relation to a hollow post 36*l* upstanding from housing face 36*k* in surrounding relation to an aperture 36*t* with one end 30*a* of the spring anchored in an anchor socket 36*m* defined by the housing and the other end 30*b* (FIG. 7) of the spring hooked into a hole in output gear 56. The spring is arranged to assist movement of output gear 56 and output shaft 54 in a direction to close vent window 16.

With cover 38 in place over housing member 36, a finger 38*b* (FIGS. 4 and 14) downstanding from the main planar body 38*c* of the cover engages the upper face 22*a* of motor 22 to press connector hub portion 46*a* downwardly in saddle 36*d* and press motor output shaft 44*a* downwardly in saddle 36*e* and a socket 38*d* defined on the lower face of the cover journals the upper pilot end 44*a* of shaft 54. Socket 38*d* is coaxial with the axis of bore 36*j* whereby to provide precise perpendicular or cross positioning of the axis of shaft 54 relative to the axis of shaft 48 and relative to the axis of the motor output shaft. The in place cover also serves to trap bearings 52 in sockets 36*j* whereby to firmly position the axis of shaft 48 and further serves to preclude upward displacement of spring 30. The dimensional parameters are chosen such that (1) the lower face 22*b* of the in place motor is spaced above the floor 36*n* of cavity 36*c* so that the in place motor is supported solely by saddles 36*d* and 36*e* and finger 38*b*, and (2) finger 38*b* is compressed between the main body of the cover and the upper face of the motor to pressure seat hub portion 46*a* and output shaft 44*a* in the respective saddles.

Link 32 (FIGS. 1, 2, and 11) includes a main body portion 32*a* and a crank or pivot arm portion 32*b*. Main body portion 32*a* is internally splined and is fitted over external splines 54*b* on shaft 54 within bore 36*j* of the housing and extends outwardly from the lower face of the housing to position pivot arm portion 32*b* exteriorly of the housing.

Handle 34 is suitably pivotally secured to the free end of pivot arm portion 32*b* and includes a ball socket joint 34*a* at its free end for suitable connection to a bracket 60 suitably secured to an inner face of vent window 16.

Power is provided to the motor 22 via a pair of terminals 62 and 64. Each terminal defines a prong or plug portion 62*a*/64*a*, a contact portion 62*b*/64*b*, and a bridge portion 62*c*/64*c* interconnecting the prong and contact portions.

Figure 16:
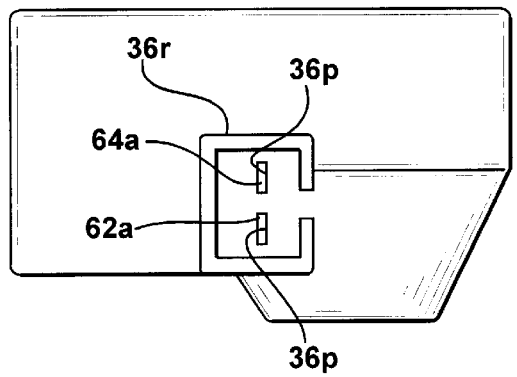
FIG. 16 is a detail end view of the actuator housing.

When assembling the actuator, terminal prong portions 62*a*, 64*a* are passed through apertures 36*p* (FIGS. 14 and 16) in housing end wall 36*q* proximate saddle 36*d* to position the prong portions 62*a*/64*a* in on edge stacked relation in an external socket housing 36r formed integrally with housing member 36 and extending from housing wall 36q and position pilot portions 62d/64d of contacts 62b/64b in laterally spaced locator holes 36s in housing floor 36n proximate saddle 36d. Motor 22 is now installed in cavity 36c by positioning connector hub 46a in saddle 36d and positioning output shaft 44a in saddle 36e while simultaneously inserting contacts 62b/64b in laterally spaced female sockets 66 (FIGS. 4 and 14) mounted in the lower face of connector 46, whereby to power the actuator simply by inserting an electrical plug into the open end of socket housing 36r to access the stacked prongs 62a/64a.

The ratios of the successive worm drive assembly are chosen such as to provide an overall drive ratio between the output shaft of the motor and the link 32 of 600:1 and the parameters of the vent window are chosen such that the window undergoes a movement of 135° between open and shut positions.

The vent window actuator of the invention will be seen to provide many important advantages. Specifically, the overall drive ratio provided by the successive worm drives allows the use of a relatively small and relatively inexpensive motor thereby providing cost savings. Further cost savings are provided by the fact that the motor may comprise a volume-produced motor already in volume use to control automotive door lock circuits. The cost of the actuator is further reduced by the use of a plastic worm wheel in engagement with the motor worm. The use of a plastic worm wheel engaging the motor worm is made possible by the fact that the worm drive of the output shaft assembly absorbs much of the back loading in the system so that the loading experienced at the interface of the motor worm and the worm wheel of the output worm assembly is sufficiently reduced to allow the use of a non-ferrous, relatively inexpensive material at this interface. The use of two successive worm drives also provides quieter operation for the actuator as compared to prior art actuators employing metal-to-metal drive throughout and the cross axis gearing defined by the successive worm drives provides a compact package allowing a reduction in the overall size of the actuator. The actuator package size is further reduced by the use of a smaller motor. The cross axis arrangement of the gearing also reduces shaft misalignment problems and provides a smooth, robust drive mechanism. The mounting of the motor in the housing utilizing the saddles engaging the free end of the motor output shaft and the hub portion on the integral connector in combination with the finger of the cover provides firm mounting for the motor whereby to reduce motor wobble and minimize wear in the drive system occasioned by misalignments. The use of a connector formed integrally with the motor and positioned within the housing of the actuator further reduces the complexity and cost of the unit since the connector in known manner incorporates built-in RFI provisions so that there is no need to separately provide radio frequency interference protection for the actuator. The use of the spherical bearings mounting the output shaft assembly provides a further self-aligning feature whereby to further minimize wear in the system due to misalignments in the drive assembly. The use of the separate assist spring coacting with the output shaft assembly allows the use of a relatively small motor even in installations requiring a high sealing force as between the vent window and the adjacent window seal of the motor vehicle. The integration of the connector into the motor and thereby into the housing combined with the terminals extending from the outside of the housing provide a simple and inexpensive electrical connection for the motor, and the rigid enclosed box design of the housing adds strength to the actuator as compared to prior art actuators utilizing a relatively weak open section housing.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An actuator for a vent window of a motor vehicle, the actuator including a housing, an electric motor mounted on the housing, and including an output shaft, a pivot arm mounted on the housing and adapted to be connected to the vent window to effect opening and closing movement of the vent window in response to pivotal movement of the pivot arm, and a drive mechanism interconnecting the output of the motor and the pivot arm and operative in response to energization of the motor to pivot the pivot arm and move the vent window, characterized in that:

the drive mechanism comprises a first worm driven by the motor output shaft, a first worm wheel driven by the first worm, a second worm driven by the first worm wheel, and a second worm wheel driven by the second worm and driving the pivot arm; and the actuator further includes a coil spring mounted on the housing proximate the second worm wheel and operative to assist the second worm wheel in generating a sealing force sufficient to positively seal the vent window against a window seal of the motor vehicle.

2. An actuator for a vent window of a motor vehicle, the actuator including a housing, an electric motor mounted on the housing, a pivot arm mounted on the housing and adapted to be connected to the vent window to effect opening and closing movement of the vent window in response to pivotal movement of the pivot arm, and a drive mechanism interconnecting the output of the motor and the pivot arm and operative in response to energization of the motor to pivot the pivot arm and move the vent window, characterized in that:

the drive mechanism comprises a first shaft extending coaxially forwardly from the motor output shaft and driven by the motor, a second shaft driven by the first shaft and extending perpendicular to the first shaft, and a third shaft positioned forwardly of the second shaft, extending perpendicular to the first and second shafts, driven by the second shaft, and driving the pivot arm.

3. An actuator according to claim 2 wherein:

the drive mechanism further includes a first worm driven by the first shaft;

the second shaft is driven by a first worm wheel driven by the first worm; and the third shaft is driven by a second worm wheel driven by the second worm.

4. An actuator according to claim 3 wherein the first worm wheel is formed of a plastic material.

5. An actuator according to claim 3 wherein:

the motor includes a hub at one end thereof and an output shaft at another end thereof comprising the first shaft;

the first worm is mounted on the motor output shaft;

the housing includes a cavity, a first saddle proximate one end of the cavity, and a second saddle proximate another end of the cavity; and the motor is mount ed in the cavity with a free end of the output shaft journaled in the first saddle and the motor hub seated in the second saddle.

6. An actuator according to claim 2 wherein:

the housing includes a main body housing member and a generally planar housing cover;

the main body housing member defines a cavity receiving the motor and further defines a bore journaling the third shaft; and the cover defines a socket coaxial with the bore and journaling a free end of the third shaft.

7. An actuator for a vent window of a motor vehicle, the actuator including a housing, an electric motor mounted on the housing, a pivot arm mounted on the housing and adapted to be connected to the vent window to effect opening and closing movement of the vent window in response to pivotal movement of the pivot arm, and a drive mechanism interconnecting the output of the motor and the pivot arm and operative in response to energization of the motor to pivot the pivot arm and move the vent window, characterized in that:

the drive mechanism comprises a first shaft extending coaxial with the motor output and driven by the motor, a second shaft driven by the first shaft and extending perpendicular to the first shaft, and a third shaft extending perpendicular to the first and second shafts, driven by the second shaft, and driving the pivot arm;

the drive mechanism further includes a first worm driven by the first shaft;

the second shaft is driven by a first worm wheel driven by the first worm;

the third shaft is driven by a second worm wheel driven by the second worm; and the actuator further includes a coil spring mounted on the housing proximate the second worm wheel and operative to assist the second worm wheel in generating a force sufficient to positively seal the vent window against a window seal of the motor vehicle.

8. An actuator for a vent window of a motor vehicle, the actuator including a housing, an electric motor mounted on the housing, a pivot arm mounted on the housing and adapted to be connected to the vent window to effect opening and closing movement of the vent window in response to pivotal movement of the pivot arm, and a drive mechanism interconnecting the output of the motor and the pivot arm and operative in response to energization of the motor to pivot the pivot arm and move the vent window, characterized in that:

the drive mechanism comprises a first shaft extending coaxial with the motor output and driven by the motor, a second shaft driven by the first shaft and extending perpendicular to the first shaft, and a third shaft extending perpendicular to the first and second shafts, driven by the second shaft, and driving the pivot arm;

the drive mechanism further includes a first worm driven by the first shaft;

the second shaft is driven by a first worm wheel driven by the first worm;

the third shaft is driven by a second worm wheel driven by the second worm;

the motor includes a hub at one end thereof and an output shaft at another end thereof comprising the first shaft;

the first worm is mounted on the motor output shaft;

the housing includes a cavity, a first saddle proximate one end of the cavity, and a second saddle proximate another end of the cavity;

the motor is mounted in the cavity with a free end of the output shaft journaled in the first saddle and the motor hub seated in the second saddle;

the housing includes a main body member defining the cavity and the saddles and a generally planer cover closing the cavity; and the cover includes a finger extending downwardly to engage an upper face of the motor to positively load the output shaft and the hub into the respective saddles.

\* \* \* \* \*